Patented Oct. 3, 1939

2,175,081

UNITED STATES PATENT OFFICE 2,175,081

TREATMENT OF WELLS

John J. Grebe, Midland, Mich., assignor to The Dow Chemical Company, Midland, Mich., a corporation of Michigan No Drawing. Application July 6, 1937, Serial No. 152,142

3 Claims. (Cl. 166—21)

The invention relates to the treatment of deep wells, such as oil, gas, brine, or water wells, to increase the yield therefrom. It more particularly concerns the treatment of wells drilled into a calcareous formation.

The decline in production of wells, particularly those yielding oil or gas, is a matter of common observation. In attempts to raise the output of such wells, it is usual to treat them by introducing into the well and thence into the formation a charge of hydrochloric acid to dissolve calcareous matter in the formation, whereby its permeability to the flow of fluid is increased. Although such treatments are in general very effective to increase the output, it is a matter of record that some wells do not respond satisfactorily. This is so even with wells the surrounding formations of which are substantially soluble in hydrochloric acid and should, therefore, be amenable to acid treatment.

My experiments have also shown that dissolving with hydrochloric acid alone the calcareous matter in cores taken from a variety of limestone formations does not always bring about as great an increase in their permeability as was to be expected in view of the amount of calcareous matter actually dissolved by the acid. In some cases, I have found that the acidization of cores decreases their permeability.

I have found that the anomalous effects of hydrochloric acid on the permeability of calcareous formations may be due to the deposition therein of a gelatinous precipitate of ferric iron hydrate. This precipitate of the hydrate is formed as the acid becomes neutralized by its action upon rocks containing acid-soluble ferric iron compounds. Whenever such formations are acidized, the acid-soluble iron compounds are at first dissolved by the acid, but these compounds remain dissolved in the acid solution only as long as its pH value is less than 3. As the acid solution continues to act upon the rock, it becomes neutralized and the pH value of the solution is thus raised to a value materially higher than 3. Thus the spent acid solution can no longer retain in solution the iron previously dissolved and this is precipitated from the solution forming insoluble gelatinous deposits in the interstices of the rock. Therefore, instead of obtaining a substantial increase in permeability of the rock and a corresponding increase in output from the well, acidization may, when the formation contains acid-soluble ferric iron compounds, produce only a minor increase, or even a reduction in output.

It is an object of this invention to provide an improved method of acidizing wells wherein the aforementioned difficulties are largely overcome. Other objects and advantages will become apparent as the description of the invention proceeds.

I have now found that the foregoing difficulties can be substantially, if not entirely, eliminated by introducing into the well, under sufficient pressure to be forced into the surrounding formation, an aqueous solution of a reducing acid instead of the usual non-reducing acid solution heretofore used. I have found that, by treating the earth formation surrounding the well bore with such a solution, the precipitation of clogging deposits as the acid becomes neutralized by the calcareous matter does not occur to any material extent, and a greater increase in output is obtainable than can be obtained by employing similar quantities of non-reducing acid solutions of an equivalent total acidity.

In carrying out my improved treatment according to the invention, a charge of an aqueous reducing acid solution is introduced into the well under sufficient pressure to be forced into the formation, pressure being maintained upon the solution while it is permitted to act upon the formation. After a time, the pressure is released and the well put back in production.

Sulphurous acid is a suitable aqueous reducing acid solution, which may be made by dissolving from 2 to 20 per cent of sulphur dioxide in water. Sulphur dioxide may also be dissolved in a strong mineral acid solution, such as hydrochloric acid containing from 5 to 25 per cent of hydrogen chloride, in which case from 0.1 to about 6 per cent of sulphur dioxide may be dissolved therein. Saline water or brine may also be used as the aqueous medium in which to dissolve the sulphur dioxide to form the desired reducing acid solution. Although aqueous solutions containing sulphurous acid are preferred for use in the method, if desired, other aqueous acid solutions capable of reducing ferric compounds to the ferrous state may be employed.

Other modes of applying the principle of my invention may be employed instead of those explained, change being made as regards the step stated by any of the following claims, provided the equivalent of such stated step be employed.

I therefore particularly point out and distinctly claim as my invention:

1. In a method of treating a well, the step which consists in introducing into the well a strong mineral acid containing sulphurous acid.

2. In a method of treating a well, the step which consists in introducing into the well an aqueous reducing acid containing about 5 to 25 per cent of hydrogen chloride and about 0.1 to 6.0 per cent of sulphur dioxide.

3. In a method of treating a well, the step which consists in introducing into the well under sufficient pressure to be forced into the surrounding formation an aqueous solution containing sulphurous acid.

JOHN J. GREBE.